3,198,850
THERMOSETTING SURFACE-COATING COMPOSITIONS COMPRISING A POLYEPOXIDE, AN ALKYLATED AMINOPLAST, AND A COPOLYMER OF AN HYDROXYALKYL ESTER OF AN $\alpha,\beta$-UNSATURATED CARBOXYLIC ACID
Allen Melvin Levantin, Philadelphia, Pa., assignor to Rohm & Haas Company, Philadelphia, Pa., a corporation of Delaware
No Drawing. Filed Apr. 11, 1962, Ser. No. 186,661
6 Claims. (Cl. 260—834)

This application is a continuation-in-part of my application Serial No. 785,799 filed January 9, 1959, and now abandoned.

This invention is concerned with thermosetting coating compositions comprising (A) an alkylated aminoplast resin-forming condensate, (B) a thermoplastic copolymer of (1) an hydroxyalkyl ester of a monoethylenically $\alpha,\beta$-unsaturated carboxylic acid and (2) one or more other monoethylenically unsaturated copolymerizable compounds containing a $CH_2=CH-$ group, and (C) a polyepoxide. It is particularly concerned with coating compositions of thermosetting character which are capable of producing coatings which are resistant to household detergents and are, therefore, suitable for use as clear or pigmented finishes for household appliances.

Frazier et al. United States Patent No. 2,681,897 discloses thermosetting coating compositions comprising an alkylated aminoplast and a thermoplastic copolymer of an hydroxyalkyl ester of an $\alpha,\beta$-unsaturated carboxylic acid, such as acrylic or methacrylic acid. It has been found that coatings obtained from such compositions have poor resistance to certain modern detergents, particularly those containing alkaline phosphates, ethylene oxide condensates of, and sulfonates and sulfates of, higher $C_8$ to $C_{18}$ fatty alcohols, acids, and amides thereof, and alkylaryl sulfonates such as ($C_3$–$C_{18}$ alkyl)-phenyl or naphthyl sulfonates. Such detergents are commonly employed in the household for dishwashing, laundering, and general cleaning purposes and, consequently, are normally employed for the cleaning of household appliances such as dishwashers, stoves, refrigerators, and the like. It is an object of the present invention to provide compositions which, on baking, are capable of producing coatings which are hard, insoluble, and resistant to such modern detergents so that they are suitable for the finishing of household appliances.

In accordance with the present invention, it has been discovered that coating compositions comprising, in certain limited proportions, an alkylated aminoplast, a polyepoxide, and a thermoplastic copolymer containing 5 to 15% by weight of an hydroxyalkyl ester of a monoethylenically $\alpha,\beta$-unsaturated carboxylic acid, 0 to 4% by weight of a copolymerizable $\alpha,\beta$-monoethylenically unsaturated carboxylic acid, and one or more other copolymerizable monoethylenically unsaturated compounds containing a $CH_2=CH-$ group, which latter compounds are devoid of carboxyl and alcoholic hydroxyl groups, produce coatings having outstanding resistance to modern household detergents. An essential feature of the present invention is the fact that the several components mentioned are present in the following relative proportions:

| | Percent by weight |
|---|---|
| Thermoplastic copolymer | 65 to 85 |
| Aminoplast | 10 to 25 |
| Polyepoxide | 5 to 20 |

The limits of the ranges given are, of course, qualified by mutual compatibility within the final coating and the solvent system employed. Thus, a particular copolymer may not be compatible, over the full range given, with a particular combination of polyepoxide and aminoplast. They should ordinarily be mixed in proportions wherein they show mutual compatibility unless unusual, special effects, such as delustring, are desired.

It is essential that the polyepoxide constitute no more than 20% by weight of the total weight of the mixure of copolymer, aminoplast, and polyepoxide since the use of higher proportions makes the compositions excessively sensitive to discoloration on heating, as a result either of accidental over-baking of the coatings or of storage or use of the coatings under high temperature conditions; e.g., in the case of a kitchen stove. Use of appreciably more than 25% by weight of aminoplast must also be avoided in order to provide tough coatings rather than brittle ones. It is also essential that the number of units in the copolymer containing carboxyl groups should not exceed about 4% by weight of the copolymer since the excess tends to make the coatings inordinately water-sensitive. A somewhat similar effect is often noted when the copolymer contains appreciably more than 15% by weight of units containing hydroxyl groups unless a large amount of polyepoxide is present to counteract this effect. However, the tendency of excessive polyepoxide to cause discoloration circumscribes the extent to which this expedient may be used.

Representative of the hydroxyalkyl esters of the $\alpha,\beta$-unsaturated carboxylic acids which may be used to form copolymers used in the practice of the present invention are 2-hydroxyethyl acrylate, 2-hydroxypropyl acrylate or methacrylate, 3-hydroxypropyl acrylate or methacrylate, 4-hydroxybuyl acrylate, 5-hydroxyamyl acrylate, 6-hydroxyhexyl acrylate, 7-hydroxyheptyl acrylate, 8-hydroxyoctyl acrylate, 9-hydroxynonyl acrylate, 10-hydroxydecyl acrylate, 2-hydroxyethyl methacrylate, 6-hydroxyhexyl methacrylate, 8-hydroxyoctyl methacrylate, 10-hydroxydecyl methacrylate, 3-hydroxypropyl crotonate, 5-hydroxyamyl crotonate, 6-hydroxyhexyl crotonate, 7-hydroxyheptyl crotonate, 10-hydroxydecyl crotonate, di(2-hydroxyethyl maleate, di(4-hydroxybutyl)maleate, di(6-hydroxyhexyl)maleate, di(9-hydroxynonyl)maleate, di(10-hydroxydecyl)maleate, di(2-hydroxyethyl)fumarate, di-(4-hydroxybutyl)fumarate, di(6-hydroxyhexyl)fumarate, di(10-hydroxydecyl)fumarate, and the like. Additionally, other substituents may be incorporated into the alkyl chain, including secondary hydroxy groups, halide radicals, nitrile radicals, and the like, such as 2,3-dihydroxypropyl acrylate, 3,5-dihydroxyamyl crotonate, 6,10-dihydroxydecyl methacrylate, di-2,6-dihydroxyhexyl maleate, di-2-chloro 7-hydroxyheptyl fumarate and the like. Obviously, mixtures of these esters may be used in the copolymer formation. In all cases, the hydroxyl of each hydroxyalkyl group is at least two carbon atoms removed from the carbon atom of the adjacent —COO— radical in the ester.

The composition of the copolymer preferably includes from 5 to 15% of an hydroxyalkyl arcrylate or methacrylate of the formula

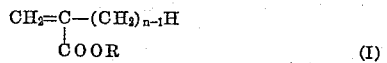

(I)

in which $n$ is an integer having a value of 1 to 2, and
R is an hydroxyalkyl group having 2 to 10 carbon atoms and having at least one hydroxyl group attached to a carbon atom other than that attached to the —COO— group, and is preferably of the formula

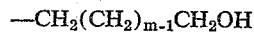

wherein $m$ is 1 or 2.

The copolymer may comprise up to 4%, and preferably does comprise from 1 to 4%, by weight of a copolymerizable unsaturated acid, such as maleic acid, fumaric acid, aconitic acid, citraconic acid, crotonic acid; but for most practical purposes acrylic acid, methacrylic acid, or itaconic acid is preferred. The inclusion of the acid in the copolymer is particularly desirable when pigmented compositions are used since it markedly enhances the gloss of coatings obtained from such compositions.

Other monoethylenically unsaturated compounds copolymerizable with the hydroxyl and acidic monomers which may be used include esters of acrylic acid or methacrylic acid with cyclohexanol, benzyl alcohol, or alkanols having 1 to 18 carbon atoms and preferably from 1 to 4 carbon atoms; acrylonitrile, methacrylonitrile, styrene, or vinyltoluene. The hardness, flexibility, toughness, and adhesion for various substrates can be varied widely as desired by suitably adjusting the proportions of these various monomers. For example, a copolymer containing 95% of an ester of acrylic acid such as methyl, ethyl, or butyl acrylate with 5% of β-hydroxyethyl acrylate or methacrylate produces films which are extremely flexible and adherent. On the other hand, a copolymer of 95% by weight of methyl methacrylate with 5% by weight of β-hydroxyethyl acrylate or methacrylate produces an extremely hard film, which is suitable for relatively rigid substrates but is insufficiently flexible to be applied to highly flexible substrates such as of paper, leather, or textiles.

The copolymers may be prepared in any suitable fashion. They should have a molecular weight in the range of about 10,000 to about 130,000 viscosity average and for this purpose solution polymerization, particularly in a solvent which may be employed as the solvent for the coating application, is generally preferred. The monomers comprising the hydroxyalkyl ester and other monoethylenically unsaturated compounds in the proportions needed to give the composition hereinabove defined are mixed in the solvent at a concentration of about 10 to 60% total monomer in the entire solution and any suitable free-radical initiator soluble in the solvent is introduced. The initiator may be an azo catalyst, a peroxygen compound, such as t-butyl peracetate, or a peroxide, such as benzoyl peroxide, or a hydroperoxide, such as t-butyl hydroperoxide, or cumene hydroperoxide. The solution is heated to reflux to effect copolymerization and held at reflux for a period of 2 to 6 hours or more. Thereafter, the solution of the copolymer may be cooled and the aminoplast solution prepared as described hereinafter may be introduced with adjustment of the solvent content to provide the concentration desired. Pigments, extenders, curing catalysts, and any other adjuvants may then be added.

The alkylated aminoplasts which may be used include those obtained by the alkylation with an alkanol having from 1 to 6 carbon atoms or cyclohexanol, or a condensate of an aldehyde with urea, N,N'-ethyleneurea, dicyandiamide, and aminotriazines. Both water-soluble and water-insoluble alkylated aminoplast condensates may be employed provided they are soluble in the organic solvent employed in making the coating compositions. Thus, such water-soluble condensates as the methylated dimethylolurea condensates can be employed provided the alkylation with methanol is sufficiently complete, and preferably substantially 100%, to render the alkylated condensate soluble in the organic solvents mentioned hereinafter. In general, the alkylated condensates should have at least 80% and preferably 100% of the methylol groups alkylated with cyclohexanol or an alkanol having 1 to 6 carbon atoms. Preferably, the alkylation products of alcohols having from 3 to 6 carbon atoms are employed and the butylated products are particularly valuable because of their greater compatibility with a wide range of copolymers and solvents mentioned hereinafter.

Among the aminotriazines which are suitable are melamine, acetoguanamine, benzoguanamine, formoguanamine, N-(t-butyl)melamine, N-(t-octyl)belamine in which the t-octyl group has the formula $$-C(CH_3)_2CH_2C(CH_3)_3$$

ammeline, 2-chloro-4,6-diamino-1,3,5-triazine, 2-phenyl-p-oxy-4,6-diamino-1,3,5-triazine, 6-methyl-2,4 - diamino-1,3,5-triazine, 2,4,6 - trihydrazine - 1,3,5 - triazine, 2,4,6-triethyl-triamino-1,3,5-triazine, and the N,N-di($C_1$–$C_4$) alkyl melamines such as N,N-dimethylmelamine. While any aldehyde may be employed each as acetaldehyde crotonaldehyde, and acrolein, the condensates obtained using formaldehyde and revertible polymers thereof such as paraformaldehyde are preferably employed.

To the solution of polymer there is added a polyepoxide. The polyepoxides contemplated are those which contain at least two epoxy groups in which the oxygen is attached to adjacent carbon atoms connected together in a chain by a single valence bond. These epoxy groups may be termed vic-epoxy groups. The preferred polyepoxides are those which contain a terminal epoxy group of the formula.

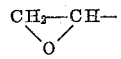
(II)

These resin-forming polyepoxides may be termed "ethoxyline" resins and are more particularly defined as organic compounds free of functional groups other than hydroxyl and epoxy groups which contain at least two vic-epoxy groups in which the oxygen is attached to adjacent singly-bonded carbon atoms and which have a molecular weight in the range of about 250 to 5,000. The polyepoxides having epoxy equivalencies from 100 to 1025 have generally been found to have satisfactory compatibility with the copolymers and aminoplast hereindefined. Those having greater epoxy equivalencies up to about 1,500 or higher are not generally compatible but may be used when special care is taken to select components of the copolymer and aminoplast resin, as well as the proportions thereof relative to polyepoxide, to provide mutual compatibility.

Polyepoxides that may be used include glycol-bis-exo-dihydrodicyclopentadienyl ethers having general formula:

$$O'=C_{10}H_{13}-O-R-O-C_{10}H_{13}=O' \quad (III)$$

in which $C_{10}H_{13}$ is the radical of exo-dihydrodicyclopentadiene, the two O' groups are oxygen atoms which together with two adjacent carbon atoms in the $C_{10}H_{13}$ radicals form oxirane rings, and R is either (a) an alkylene group of 2 to 12 carbon atoms or (b) a radical of an etherified polyalkylene glycol, which radical has the formula $(R'-O-)_xR'$ in which R' is an alkylene group of 2 to 4 carbon atoms and x is an integer having a value of 1 to 8 inclusive. These compounds and their production are described in U.S. Patent No. 2,543,419. There may also be used the "ethoxyline resins" available under the trade names of Epon or Araldite resins. They are polyether derivatives of a polyhydric phenol containing epoxy groups and may be prepared by effecting reaction between epichlorohydrin and a polyhydroxy phenol or alcohol, for example, hydroquinone, resorcinol, glycerine, or condensation products of phenols with ketones for instance, bis-(4-dihydroxydiphenyl)-2,2-propane. For example, the reaction of epichlorohydrin with bis-(4-hydroxyphenyl)-2,2-propane may be formulated as follows:

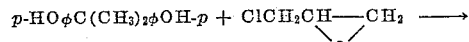

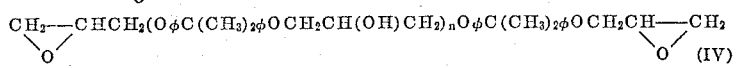
(IV)

where φ is the phenylene group and $n$ has an average value varying from around zero to about 7. These resins may be made by the method disclosed in 2,324,483, 2,444,333, British Patents 518,057 and 579,698. Many of these ethoxyline resins are sold under the name of Epon resins or Araldite resins. Data on the Epon resins are given in the table below:

TABLE I

| Epon No. | Epoxide Equivalent | Approximate Esterification Equivalent | M.P., 0° C. |
|---|---|---|---|
| RN-34 | 225-290 | 105 | 20-28 |
| RN-48 | 192 | 80 | 9 |
| 1064 | 300-375 | 105 | 40-45 |
| 1062 | 140-165 | | Liquid |
| 1004 | 905-985 | 175 | 97-103 |
| 1001 | 450-525 | 130 | 64-76 |

Also, there may be used polyepoxides of the formula

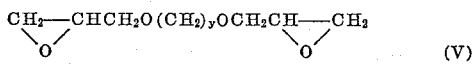

(V)

where $y$ is a number having an average value of 2 to 4. Epon 562 and Epon 828 are of this type, are liquid at normal room conditions and have "Epoxide Equivalent" values of 140–165 (Epon 562) and 190–210 (Epon 828), respectively. Also, a diepoxide or triepoxide of glycerol may be used. These aliphatic polyepoxides may be prepared in the known fashion as described, for example, in United States Patents Nos. 2,730,427 and 2,752,269. The preferred polyepoxides are those having average molecular weights of about 250 to 1,000.

Any suitable concentration of the mixture of the copolymer, polyepoxide, and aminoplast in the solvent may be employed such as from 1 to 50% by weight. If a pigment is present, the total solids concentration in the coating composition may be from 5 to 75% by weight. The ratio of pigment to binder (using the latter term to embrace the copolymer, polyepoxide, and the aminoplast condensate) may be from 1:20 to 20:1.

The solvents that may be employed include such hydrocarbons as benzene, toluene, xylenes, and aromatic naphthas or mixtures of such solvents; esters such as ethyl, butyl, amyl, ethoxyethyl, or methoxyethyl acetates, lactates, or propionates; ketones such as acetone, methyl isopropyl ketone, methyl isobutyl ketone, dioxane, isophorone, and cyclohexanone; alcohols such as n-butanol, t-butanol, isopropyl alcohol, n-propyl alcohol, amyl alcohols, and cyclohexanol; ethers, such as diethyl ether, the monoethyl ether of ethylene glycol, the monomethyl ether of ethylene glycol, and the monobutyl ether of ethylene glycol; and miscellaneous solvents including dimethylformamide, dimethylacetamide, acetonitrile, nitromethane, nitroethane, nitropropane, and nitrobutane; as well as mixtures of two or more solvent materials either from the same group or any or all of the groups just listed.

Pigments suitable for use according to the invention are inorganic pigments such as, for example, chrome yellows, Prussian blues and Brunswick greens, titanium pigments such as titanium dioxide, extended titanium pigments (extended with either precipitated or natural extenders, such as alkali earth sulfate for instance calcium sulfate, barium sulfate, and the like), tinted titanium pigments, titanates such as barium, zinc, lead, magnesium titanates, and the like. Additionally, other types of inorganic pigments might be included, such as zinc sulfide pigments, for instance, zinc sulfide, lithopone, other extended zinc sulfide pigments, such as calcium base lithopone, zinc sulfide extended with natural extenders and the like, zinc oxide and antimony oxide, or organic pigments; that is, organic coloring matters which are devoid of sulfonic, carboxylic, or other water-solubilizing groups. Also, for the purposes of this invention, we include within the term "pigment" other water-insoluble organic coloring matters such as, for example, the calcium or barium lakes of azo lake dyestuffs.

The compositions of the present invention are adapted to be applied in any suitable fashion to the substrate to be coated such as by brushing, spraying, dipping, roller coating, or the like, then dried and finally cured by baking. Generally, it is unnecessary to add any other material to catalyze the reaction but, if desired, an acidic catalyst may be included. The amount of such a catalyst may be from 0.1 to 1% by weight, based on the weight of aminoplast condensate. The use of the curing catalyst may be particularly desirable, however, when lower temperatures of curing or baking are needed. With such curing catalyst, insolubilization can be accomplished simply by drying and ageing at room temperature. Among the curing catalysts that may be used to cure the composition of the present invention are any of the acid catalysts and, included in that group, are the organic and the inorganic acid catalysts. One may use, for instance, in catalytic amounts, sulfuric acid, hydrochloric acid, and their acid salts, such as ammonium sulfate, ammonium chloride, or an organic acid, such as acetic acid, phthalic acid, benzoic acid, toluene sulfonic acid, naphthalene sulfonic acid, and the mono-salt of maleic acid with triethylamine.

The compositions herein may be applied for the coating of a wide variety of substrates including paper, textiles, leather, wood, ceramics, brick, stone, and concrete surfaces, as well as metals. Thus, they may be used as finishing topcoats for automobiles or for the decoration of metals in general, such as tin cans or other canisters. They are particularly suitable for the finishing of household appliances, such as stoves, refrigerators, and so on because of their resistance to modern detergents.

As stated above, the compositions, after application to the substrates to be coated, are dried and cured. If a curing catalyst is present, such drying and curing may be carried out simply at room temperatures. However, whether or not a catalyst is present, drying may be effected at elevated temperatures such as at 140° F. up to 220° F. and baking may be effected at temperatures anywhere from 180° to 450° F. As is obvious from the preceding statement, drying and curing may be considered as part of one operation, the curing following the drying immediately. The time of curing may vary from a period as short as one-half to two minutes at the upper range of temperature around 450° F. up to one hour or two at the lower portion of the temperature range given, namely 180° F. A particularly practical curing operation is effected at 300° F. for a period of 15 to 30 minutes or so.

The examples immediately following illustrate the preparation of several aminoplast type condensates, but it is to be understood that the preparation of such condensates is not in itself a part of the present invention since conventionally available alkylated aminoplast condensates can be employed. The following resins designated A through D are merely typical of alkylated aminoplast resins that can be employed herewith. In these examples, the parts and percentages are by weight unless otherwise clearly indicated.

*Example A (Resin A).—Preparation of methoxymethyl melamine in butanol*

Charge:                                        Moles
  A. 1070.0 g. flake paraformaldehyde _____ 32.5
  B. 2400.0 g. methanol _____ 75.0
  C. 630.0 g. melamine _____ 5.0
  D. 5.0 ml. 50% formic acid.
  E. 620.0 g. n-butanol for dilution.

Materials A, B, C, and D were charged to a glass reaction vessel equipped with thermometer, mechanical stirrer and reflux condenser. The mixture was heated to reflux and held at reflux temperature for about 3½ hours. At the end of this time, the heat was shut off and the pH of the system adjusted to 9 to 10 with triethylamine (about 12.0 grams required).

The reaction mixture was then stripped under reduced pressure (about 20 to 30 mm. Hg) to about 82 to 85% solids (about 2,400 grams of solvent was distilled off), then cut back to about 60% solids with butanol "E." Yield: 2,320 grams of product at 61.6% solids, viscosity 2.5 poises. The product was filtered through Super-Cel.

Example B (Resin B)

126 parts of melamine and 405.5 parts of formalin (a 37% aqueous solution of formaldehyde) and 440 parts of n-butanol are introduced into a suitable reaction chamber equipped with thermometer, stirrer, reflux condenser, and a suitable water trap through which the reflux condensate passes on its return to the reaction chamber and in which the essentially aqueous fraction of the condensate may be separated from the essentially non-aqueous fraction. Means are provided so that the former fraction may be drawn off if desirable. The reaction mixture is refluxed to a temperature of about 91° to 93° C. at atmospheric pressure for 6 to 8 hours. The water is removed by azeotropic distillation from the reaction mixture during the reflux operation. The vapor temperature will be about 100° to 105° C. The pressure is lowered sufficiently to reduce the vapor temperature to about 85° to 90° C. and the resin solution is concentrated to about 50% solids by vacuum distillation.

Example C (Resin C)

3370 parts of a 37% aqueous formaldehyde solution are charged into a suitable reaction chamber and neutralized to a pH of 8.6 with 20% sodium hydroxide, and there is then added 6 parts of an 85% phosphoric acid solution. The mixture is heated to 70° C. and 1200 parts of urea are added over a one hour period. The mixture is then heated to 85° C. and held at that temperature for approximately one hour. 1340 parts of butanol are added and the mixture is heated to reflux and held at that temperature for approximately one hour. 1550 additional parts of butanol are added and the mixture distilled, while replacing distillate with a feed of dry butanol, until the batch temperature reaches about 112° C. The batch is then vacuum-concentrated at 90° C. to approximately 65% resin solids. This solution is diluted with xylene and butanol to give a final composition of 20% xylene, 30% butanol, and 50% resin solids.

Example D (Resin D)

1554 parts of a 37% aqueous formaldehyde solution with a pH adjusted to about 8 with sodium hydroxide is introduced into a suitable reaction chamber. Thereafter, 654 parts of benzoguanamine, 3 parts of magnesium carbonate, 945 parts of n-butanol and 122 parts of benzene are introduced. The reaction is heated under reflux decantation until 700 parts of water are drawn off. Seven parts of phthalic acid are then added and the heating under decantation is continued until practically all of the water (1300 parts) has been removed. The reaction mass is then cooled to about 70° to 80° C. and then filtered. The yield is about 1950 parts of resin solution containing 61 to 63% solids.

The following examples illustrate the preparation of copolymers of an hydroxyalkyl ester of an α,β-unsaturated carboxylic acid and other copolymerizable material.

Example E (Copolymer E)

A charge comprising 263.5 grams (36.1 weight percent) of methyl methacrylate, 263.5 grams (36.1 weight percent) of styrene, 108.1 grams (14.8 weight percent) of ethyl acrylate, 80.3 grams (11.0 weight percent) of β-hydroxypropyl methacrylate, 14.6 grams (2.0 weight percent) of itaconic acid, 10.95 grams (1.5% of monomer charge) of benzoyl peroxide, and 164.0 grams of the monomethyl ether of ethylene glycol is added in the course of two hours to a glass reaction vessel containing 566.0 grams of xylene maintained at 105° to 107° C. by means of external heating. The mixture in the flask is stirred during the addition and subsequent reaction and maintained at 105° to 107° C. under a nitrogen atmosphere. Two and a half hours after the start of the polymerization, the reaction is recatalyzed with 0.73 gram of additional benzoyl peroxide and the temperature maintained at 109° to 110° C. At the end of the fourth hour, the reaction is again recatalyzed with an additional 0.73 gram of benzoyl peroxide. Heating and stirring are continued for a total of twelve hours. The final composition is a clear, viscous solution of a copolymer of about 36% methyl methacrylate, 36% styrene, 15% ethyl acrylate, 11% of β-hydroxypropyl methacrylate, and 2% itaconic acid, having a viscosity of about 10 poises at approximately 50% copolymer solids in a xylene/2-methoxy-ethanol:77.6/22.4 (weight ratio) solvent system.

Example F (Copolymer F)

The procedure used for making Copolymer E is repeated substituting, for the 80.3 grams (11.0 weight percent) of β-hydroxypropyl methacrylate, 80.3 grams (11.0 weight percent) of β-hydroxypropyl acrylate. A similar solution of a copolymer of about 36% methyl methacrylate, 36% styrene, 15% ethyl acrylate, 11% of β-hydroxypropyl acrylate, and 2% itaconic acid, is obtained.

The epoxide resins referred to in the following examples are:

Epoxide A is a reaction product of glycerine and epichlorohydrin having the following characteristics: An epoxy equivalent (grams of resin containing 1 g.-equivalent of epoxide) of about 150, an equivalent weight of about 60 (grams of resin required to esterify 1 g.-mole of acetic acid), a viscosity at 25° C. of about 1.25 poises at 100% solids, soluble in water, methanol, acetone, benzene, and toluene;

Epoxide B is a condensation product of ethylene glycol and epichlorohydrin having the following characteristics: An epoxy equivalent of about 200, an equivalent weight of about 80, a viscosity of about 100 poises (100% solids at 25° C.), soluble in methanol, acetone, benzene, and toluene;

Epoxide C is a condensation product of epichlorohydrin with 4,4'-isopropylidene-bisphenol (commonly called Bisphenol A) having the following characteristics: An epoxy equivalent of about 500, an equivalent weight of about 130, melting point range 64° to 76° C., a viscosity of about 1.5 poises at 25° C. and 40% in the monobutyl ether of diethylene glycol, soluble in toluene and xylene;

Epoxide D is a condensation product of epichlorohydrin and a mixture of ethylene glycol and diethylene glycol having the following characteristics: An epoxy equivalent of about 175, an equivalent weight of about 75, a viscosity at 25° C. of about 148 poises, soluble in xylene and toluene.

The following examples in which all parts and percentages are by weight unless otherwise indicated are illustrative of the invention.

Example 1

(a) Mix 200 parts of rutile titanium dioxide with 200 parts of the 50% solution of Copolymer E (Example E) on a three-roll mill. Then mix into this paste 110.8 parts of the 50% solution of Copolymer E with 66.6 parts of a 50% solution in 2-ethoxyethyl acetate of Epoxide C, 66.6 parts of the 50% solution of butylated methylol melamine (Resin B), 195.8 parts of xylene, and 97.9 parts of 2-ethoxyethyl acetate. Adjust to a spray viscosity of 22 seconds (No. 4 Ford cup) by adding a mixture of xylene and 2-ethoxyethyl acetate (6.9:3.1 weight ratio) giving a total solids concentration of 45%. Spray the composition on bonderized steel panels to give a film thickness of 0.0015 inch after a 15-minute air-dry and a 30-minute bake at 300° F. The glossiness as determined by a 60°

Photovolt glossimeter manufactured by the Photovolt Corporation is 90+.

The baked film has a Kohinoor pencil hardness of 4H. The Kohinoor pencil hardness referred to in the examples is described in "Physical and Chemical Examination of Paints, Varnishes, Lacquers, and Colors," by Gardner, 1939, page 113. It has excellent adhesion to the bonderized steel. It is not stained by ink, mustard, or lipstick. It shows excellent resistance to a detergent consisting essentially of a mixture of sodium dodecylbenzene sulfonate (about 20%), sodium tripolyphosphate (about 40%), tetrasodium pyrophosphate (about 15%), and sodium sulfate (about 20%) when tested by immersion for 100 hours in a 1% solution of the aforesaid detergent.

(b) Bonderized steel panels are first coated with a primer of a polyepoxide resin and other such panels are first coated with an alkyd/polyepoxide primer before application of the coating composition described in part (a) in the same manner as in part (a). The baked coated panels show essentially the same properties as described in part (a).

*Example 2*

Example 1 is repeated replacing the copolymer there used with corresponding amounts (200 and 110.8 parts) of the 50% solution of Copolymer F (Example F). Similar coatings of stain-resistant and detergent-resistant character are obtained.

*Example 3*

Example 1 is repeated replacing the copolymer there used with 200-part and 94-part batches of a 50% solution in the same solvent mixture of a copolymer of 80 parts of methyl methacrylate, 15 parts of ethyl acrylate, and 5 parts of β-hydroxyethyl methacrylate. The coatings show excellent resistance to the detergent and stains mentioned in Example 1.

*Example 4*

Example 1 is repeated replacing Resin B with 54 parts of the 61.6% solution of methylated polymethylol melamine of Example A (Resin A). Similar results are obtained.

*Example 5*

Example 1 is repeated using 50% solutions of the following polyepoxide, aminoplast, and copolymer in the amounts given:

| Binder component: | 50% solution (parts by weight) |
|---|---|
| Epoxide B | 105.2 |
| Resin D | 44.4 |
| Copolymer * | 294.4 |

* 44% methyl methacrylate/30% vinyl toluene/24% β-hydroxyethyl acrylate/2% methacrylic acid.

Similar coatings of stain-resistant and detergent-resistant character are obtained.

*Example 6*

Example 1 is repeated using 50% solutions of the following polyepoxide, aminoplast, and copolymer in the amounts given:

| Binder component: | 50% solution (parts by weight) |
|---|---|
| Epoxide D | 70.6 |
| Resin B | 44.4 |
| Copolymer * | 329 |

* 20.5% acrylonitrile/20.5% α-methylstyrene/45% methyl acrylate/10% β-hydroxypropyl methacrylate/4% acrylic acid.

Similar coatings of stain-resistant and detergent-resistant character are obtained.

*Example 7*

Example 1 is repeated using 50% solutions of the following polyepoxide, aminoplast, and copolymer in the amounts given:

| Binder component: | 50% solution (parts by weight) |
|---|---|
| Epoxide C | 90.4 |
| Resin B | 66.6 |
| Copolymer E | 308.0 |

Similar coatings of stain-resistant and detergent-resistant character are obtained.

It is to be understood that changes and variations may be made without departing from the spirit and scope of the invention as defined by the appended claims.

I claim:

1. A composition consisting essentially of a compatible mixture of (A) 65 to 85% by weight of a thermoplastic copolymer of a mixture of 5 to 15% by weight of an hydroxyalkyl ester of an α,β-monoethylenically unsaturated carboxylic acid, the hydroxyl of each hydroxyalkyl group being at least two carbon atoms removed from the carbon atom of the adjacent —COO— radical in the ester, 0 to 4% by weight of a copolymerizable α,β-monoethylenically unsaturated carboxylic acid, and at least one other copolymerizable monoethylenically unsaturated compound devoid of carboxyl and alcoholic hydroxyl groups, (B) 10 to 25% by weight of a thermosetting alcohol-modified aminoplast resin condensation product of formaldehyde condensed with a member selected from the group consisting of urea, N,N'-ethyleneurea, dicyandiamide, and aminotriazines, alkylated by an alcohol selected from the group consisting of cyclohexanol and alkanols having 1 to 6 carbon atoms, and (C) 5 to 20% by weight of a resin-forming polyepoxide containing at least two vic-epoxy groups and having an epoxy equivalency of about 100 to 1025.

2. A composition suitable for coating purposes consisting essentially of a solution in an organic solvent of 1 to 50% by weight of a compatible mixture of (A) 65 to 85% by weight of a thermoplastic copolymer of a mixture of 5 to 15% by weight of an hydroxyalkyl ester of an α,β-monoethylenically unsaturated carboxylic acid, the hydroxyl of each hydroxyalkyl group being at least two carbon atoms removed from the carbon atom of the adjacent —COO— radical in the ester, 0 to 4% by weight of a copolymerizable α,β-monoethylenically unsaturated carboxylic acid, and at least one other copolymerizable monoethylenically unsaturated compound devoid of carboxyl and alcoholic hydroxyl groups, (B) 10 to 25% by weight of a thermosetting alcohol-modified aminoplast resin condensation product of formaldehyde condensed with a member selected from the group consisting of urea, N,N'-ethyleneurea, dicyandiamide, and aminotriazines, alkylated by an alcohol selected from the group consisting of cyclohexanol and alkanols having 1 to 6 carbon atoms, and (C) 5 to 20% by weight of a resin-forming polyepoxide containing at least two vic-epoxy groups and having an epoxy equivalency of about 100 to 1025.

3. A composition consisting essentially of a compatible mixture of (A) 65 to 85% by weight of a thermoplastic copolymer of a mixture of 5 to 15% by weight of an hydroxyalkyl ester of an α,β-monoethylenically unsaturated carboxylic acid, the hydroxyl of each hydroxyalkyl group being at least two carbon atoms removed from the carbon atom of the adjacent —COO— radical in the ester, 1 to 4% by weight of a copolymerizable monoethylenically α,β-unsaturated acid, and at least one other copolymerizable monoethylenically unsaturated compound devoid of carboxyl and alcoholic hydroxyl groups, (B) 10 to 25% by weight of a thermosetting alcohol-modified aminoplast resin condensation product of formaldehyde condensed with a member selected from the group consisting of urea, N,N'-ethyleneurea, dicyandiamide, and aminotriazines alkylated by an alcohol selected from the group consisting of cyclohexanol and alkanols having 1 to 6 carbon atoms, and (C) 5 to 20% by weight of a resin-forming polyepoxide containing at least two vic-epoxy groups and having an epoxy equivalency of about 100 to 1025.

4. A composition suitable for coating purposes consisting essentially of a solution in an organic solvent of 1 to 50% by weight of a compatible mixture of (A) 65 to 85% by weight of a thermoplastic copolymer of a mixture of 5 to 15% by weight of an hydroxyalkyl ester of the formula

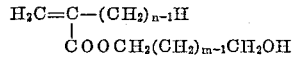

wherein $m$ and $n$ are integers having values of 1 to 2, 1 to 4% by weight of an acid selected from the group consisting of acrylic acid, methacrylic acid, and itaconic acid, and the balance to make 100% by weight of at least one monomer selected from the group consisting of acryonitrile, methacrylonitrile, styrene, vinyltoluene, and esters of an acid selected from the group consisting of acrylic acid and methacrylic acid with an alcohol selected from the group consisting of cyclohexanol, benzyl alcohol, and alkanols having 1 to 18 carbon atoms, (B) 10 to 25% by weight of a thermosetting alcohol-modified aminoplast resin condensation product of formaldehyde condensed with a member selected from the group consisting of urea, N,N'-ethyleneurea, dicyandiamide, and aminotriazines, alkylated by an alcohol selected from the group consisting of cyclohexanol and alkanols having 1 to 6 carbon atoms, and (C) 5 to 20% by weight of a resin-forming polyepoxide containing at least two vic-epoxy groups and having an epoxy equivalency of about 100 to 1025.

5. As an article of manufacture, a solid substrate having a surface thereof coated with and adhered to a baked compatible mixture of (A) 65 to 85% by weight of a thermoplastic copolymer of a mixture of 5 to 15% by weight of an hydroxyalkyl ester of an α,β-monoethylenically unsaturated carboxylic acid, the hydroxyl of each hydroxyalkyl group being at least two carbon atoms removed from the carbon atom of the adjacent —COO— radical in the ester, 0 to 4% by weight of a copolymerizable α,β-monoethylenically unsaturated carboxylic acid, and at least one other copolymerizable monoethylenically unsaturated compound devoid of carboxyl and alcoholic hydroxyl groups, (B) 10 to 25% by weight of a thermosetting alcohol-modified aminoplast resin condensation product of formaldehyde condensed with a member selected from the group consisting of urea, N,N'-ethyleneurea, dicyandiamide, and aminotriazines alkylated by an alcohol selected from the group consisting of cyclohexanol and alkanols having 1 to 6 carbon atoms, and (C) 5 to 20% by weight of a resin-forming polyepoxide containing at least two vic-epoxy groups and having an epoxy equivalency of about 100 to 1025.

6. An article as defined in claim 5 in which the substrate is a metal.

References Cited by the Examiner
UNITED STATES PATENTS

| | | | |
|---|---|---|---|
| 2,681,897 | 6/54 | Frazier et al. | 260—85.5 |
| 2,703,765 | 3/55 | Osdal | 260—834 |
| 2,816,084 | 12/57 | Nowacki | 260—831 |
| 2,908,663 | 10/59 | Masters | 260—837 |

MURRAY TILLMAN, *Primary Examiner.*

LEON J. BERCOVITZ, *Examiner.*